United States Patent [19]

Saito et al.

[11] Patent Number: 4,939,767

[45] Date of Patent: Jul. 3, 1990

[54] SYSTEM AND METHOD FOR TRANSMITTING IMAGE DATA ON A TELEPHONE NETWORK OR EQUIVALENT

[75] Inventors: Yoshinori Saito; Hiroyuki Hayasaki; Hisashi Matsuyama; Hisaharu Nakashima, all of Gifu, Japan

[73] Assignee: Sanyo Electric Co., Ltd., Osaka, Japan

[21] Appl. No.: 194,818

[22] Filed: May 17, 1988

[30] Foreign Application Priority Data

| May 20, 1987 | [JP] | Japan | 62-123567 |
| Aug. 7, 1987 | [JP] | Japan | 62-198434 |
| Nov. 19, 1987 | [JP] | Japan | 62-292402 |
| Feb. 4, 1988 | [JP] | Japan | 63-24264 |

[51] Int. Cl.$^5$ .................... H04M 11/00; H04N 7/14
[52] U.S. Cl. .................... 379/53; 379/100; 358/85; 358/434; 358/438
[58] Field of Search ........... 358/257, 85, 434, 438; 379/100, 53, 54

[56] References Cited

U.S. PATENT DOCUMENTS

| 3,614,319 | 10/1971 | Krallinger et al. | 358/257 |
| 3,914,537 | 10/1975 | Perreault et al. | 358/257 |
| 4,142,214 | 2/1979 | Yamazaki et al. | 358/257 |
| 4,521,647 | 6/1985 | Olson et al. | 379/351 |
| 4,584,434 | 4/1986 | Hashimoto | 379/100 |
| 4,715,059 | 12/1987 | Cooper-Hart et al. | 379/53 |
| 4,729,033 | 3/1988 | Yoshida | 358/257 |
| 4,754,335 | 6/1988 | Izawa et al. | 358/257 |

FOREIGN PATENT DOCUMENTS 0205401 12/1986 European Pat. Off. ............ 379/37
2166624 5/1986 United Kingdom ............ 379/100

Primary Examiner—Jin F. Ng
Assistant Examiner—Wing F. Chan
Attorney, Agent, or Firm—Darby & Darby

[57] ABSTRACT

A system for transmitting image data on a telephone network or equivalent, which typically includes video or visual telephones as apparatus of sending part and receiving part. In the video telephone of sending part, when an image data sending key is operated, a DTMF signal generator included in a modem is started to operated and a specified DTMF signal, for example, DTMF-A signal or DTMF-B signal is sent as a signal DTMF-DTA to a telephone circuit through a network control unit for approximate 300 milliseconds. Succeedingly, in spite of presence or absence of a responsive signal from the video telephone of receiving part, a non-signal state is formed for approximate 75 milliseconds, immediately thereafter, the image data is sent from the video telephone of sending part at a transmission speed of 4,800 bps or 2,400 bps. In the video telephone of receiving part, when the signal DTMF-DTA, that is, the above described DTMF-A signal or DTMF-B signal is continuously received for approximate 250 milliseconds, a modem thereof is started at 4,800 bps or 2,400 bps, and the image data being sent from the video telephone of sending part is received.

34 Claims, 17 Drawing Sheets

SYSTEM AND METHOD FOR TRANSMITTING IMAGE DATA ON A TELEPHONE NETWORK OR EQUIVALENT

BACKGROUND OF THE INVENTION

1. Field of the invention

The present invention relates to a system and method for transmitting image data on a telephone network or equivalent. More specifically, the present invention relates to a novel transmission control procedure which is suitable for sending and receiving image data of relatively small data amount through the telephone network or equivalent as a video or visual telephone system.

2. Description of the prior art

Conventionally, a facsimile communication system is well known as a system for sending and receiving the image data through a telephone network or equivalent. The facsimile communication system is adapted to transmit the image data through a transmission control procedure including phases A-E as shown in FIG. 1 in accordance with the T series recommendation of CCITT. The phase A is a phase for setting call up, the phase B is a pre-message phase, and the image data is transmitted in the phase C. The phase D is a post-message phase and the phase E is a phase for putting call down.

In the conventional transmission control procedure of the facsimile communication system, time periods required for the phases A, B, D and E are respectively approximate 3 seconds, 8 seconds, 2.5 seconds and 1 second in spite of a length of the image data. Therefore, when the data amount of the image data is small, time period which does not take part in transmission of the image data is relatively increased, thus there is a problem that a transmission efficiency becomes worse. Specially, in the video or visual telephone system in which a still picture or image is transmitted rather than a moving picture or image, the image data to be transmitted is only for one image screen, and therefore, if a complex transmission control procedure as in the conventional facsimile communication system is applied, the transmission efficiency is very bad.

SUMMARY OF THE INVENTION

Therefore, a principal object of the present invention is to provide a system for transmitting image data on a telephone network or equivalent in accordance with a novel transmission control procedure.

Another object of the present invention is to provide a system for transmitting image data oh a telephone network or equivalent, in which a transmission efficiency is good even if a data amount of image data to be transmitted is small.

The other object of the present invention is to provide a system for transmitting image data on a telephone network or equivalent in accordance with a simple transmission control procedure which is suitable for a video or visual telephone system.

In a transmission control procedure in accordance with the present invention, in an apparatus of sending part, a tone signal generator is started to operate in response to an image data sending command so that a tone signal having a specified frequency is sent for a predetermined time period, and succeedingly, in spite of presence or absence of a responsive signal from an apparatus of receiving part, the image data is sent. In the apparatus of receiving part, a modem is brought in a state for waiting reception of the image data being sent from the apparatus of sending part only when the above described specified tone signal is continuously received for more than a predetermined time period. Therefore, in the apparatus of receiving part, a state for receiving the image data is automatically set without returning a ready signal for receiving or acknowledge signal.

In accordance with the present invention, a complex and redundant transmission control procedure as in the conventional facsimile communication system is not applied, and therefore, a transmission efficiency is very good even if a data amount of the image data to be sent is small. In the conventional facsimile communication system, as described above, it is necessary to pass through the phases A, B, D and E of approximate 15 seconds in total other than the phase C for transmitting the image data; however, only a time period when the above described specific tone signal is to be sent, for example, 300-400 milliseconds is required for transmitting other than the image data, and therefore the transmission efficiency is drastically increased.

In the case where the present invention is applied to a video or visual telephone system, since the users sit in the front of the video or visual telephones of sending part and receiving part respectively, if and when the image data being sent one-sidely from the video telephone of sending part is not effectively received by the video telephone of receiving part, the user of sending part may repeat again the image data sending procedure through a telephone conversation or audio communication between the both parties. Therefore, an exceptional disadvantage due to a transmission error does not take place in comparison with the case where an automatic receiving mode is set as the facsimile communication system.

In one embodiment, a plurality of tone signals each having a different frequency are utilized. Then, in the case where the image data is intended to be sent from the apparatus of sending part at a high transmission speed, for example, 4,800 bps, one tone signal is utilized, and in the case where the image data is intended to be sent at relatively slow transmission speed of 2,400 bps, for example, another tone signal is utilized. In the apparatus of receiving part, a frequency of such a tone signal is identified and a modem is switched so as to receive the image data at the transmission speed designated by the tone signal.

Prior to sending the above described specific tone signal or signals from the apparatus of sending part, a transmission mode confirmation procedure for notifying a transmission mode to the apparatus of receiving part may be executed. In such a transmission mode confirmation procedure, a command signal consisting of a tone signal having a specified frequency or coded data is sent from the apparatus of sending part to the apparatus of receiving part. Then, in response to the command signal, the apparatus of receiving part returns an acknowledge signal or negative acknowledge signal to the apparatus of sending part. In the case where the acknowledge signal is returned from the apparatus of receiving part, in the apparatus of sending part, as described previously, the image data is sent in accordance with the transmission mode designated by the command signal immediately after sending a tone signal for a predetermined time period. If the negative acknowledge signal is returned or no responsive signal is returned from the apparatus of receiving, in the apparatus of sending part, immediately after sending the tone signal for the predetermined time period, the image data is sent in accordance with a predetermined transmission mode, for example, a default transmission mode in spite of designation by the command signal.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENT

In the following, a description will be made on the case where the present invention is embodied in a video or visual telephone system. However, it is pointed out in advance that the present invention is also applicable any apparatus or system for transmitting image data by utilizing the telephone network or equivalent other than such a video or visual telephone system.

Figure 1:
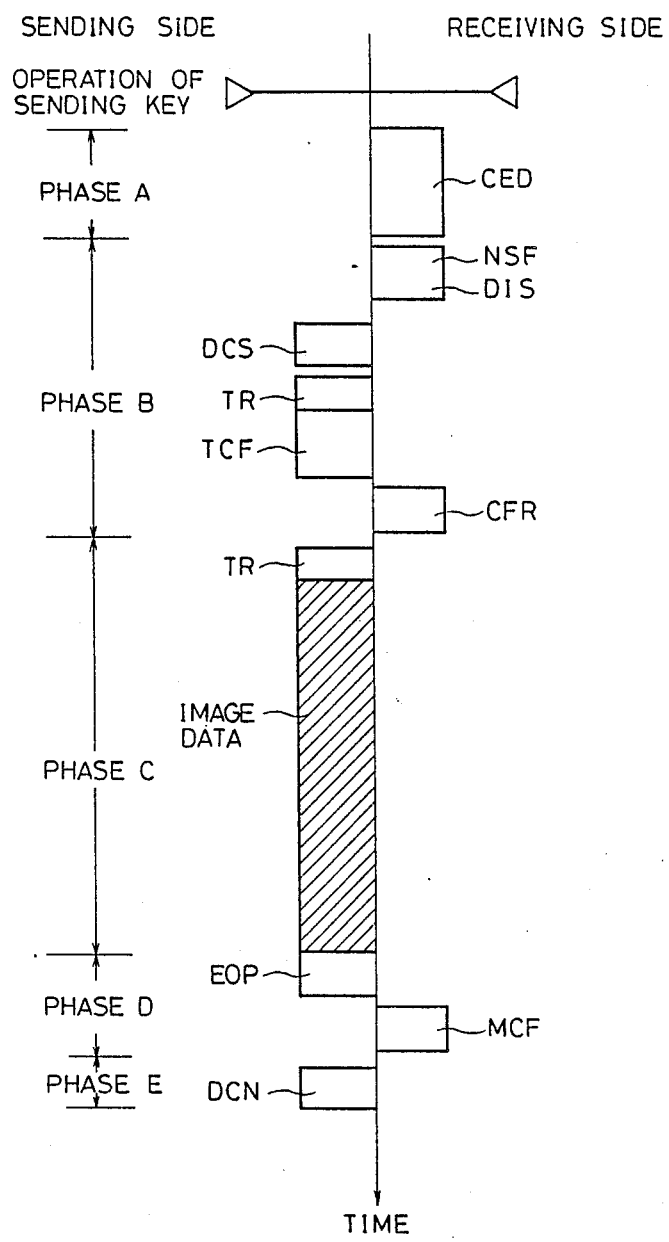
FIG. 1 is an illustrative view showing a transmission control procedure in a conventional facsimile communication system in accordance with the T series recommendations of CCITT.
Figure 2:
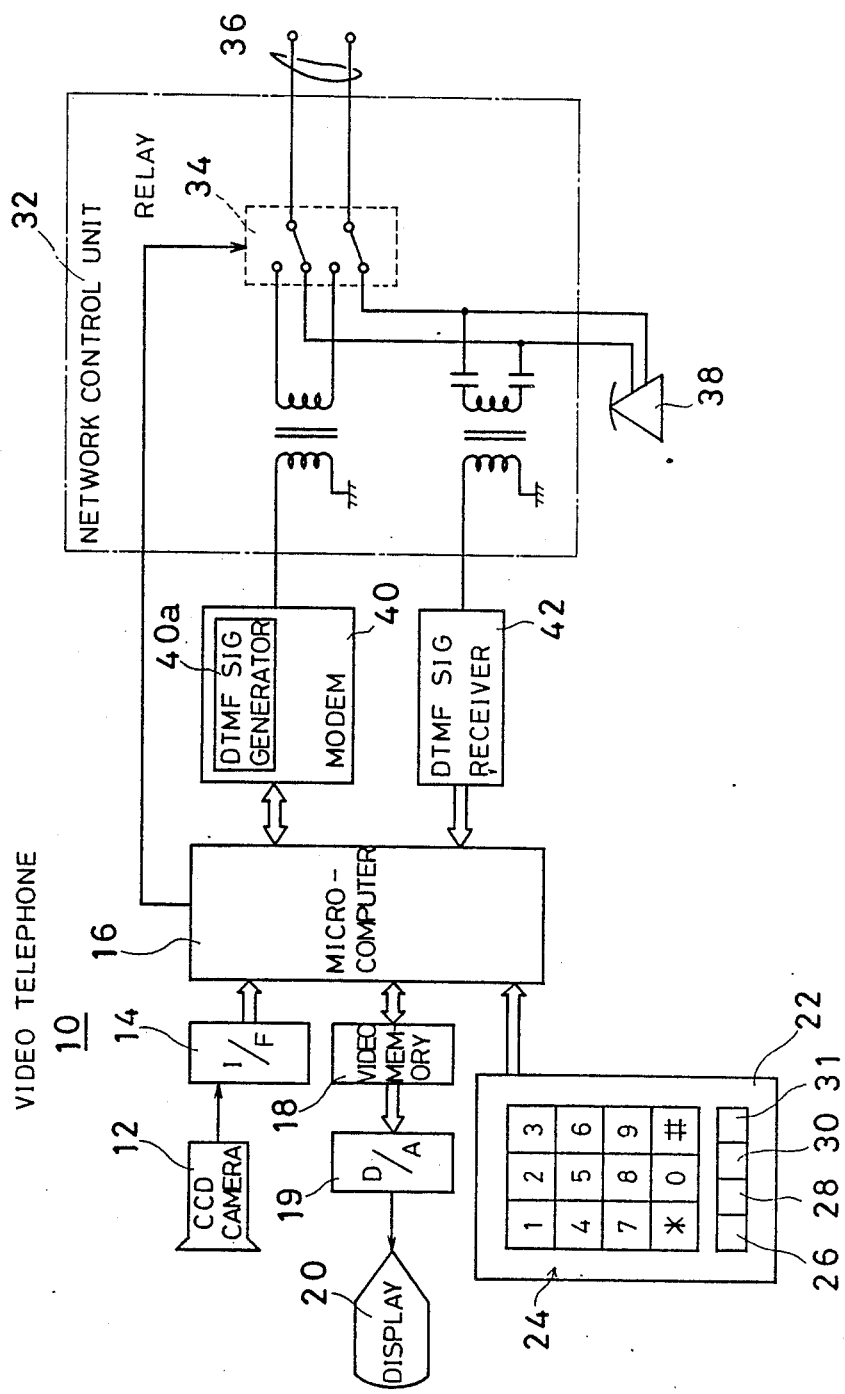
FIG. 2 is a block diagram showing one example of a video or visual telephone to which the present invention is applicable.

With referring to FIG. 2, a video or visual telephone 10 which can be utilized in this embodiment includes a CCD camera 12. An image taken by the CCD camera 12 is converted into image data of a digital fashion and stored into a video memory 18 under the control of a microcomputer 16. In the video memory 18, image data which is sent from a video or visual telephone of the other party can be stored. The image data which has been stored in the video memory 18 is sequentially read and converted into a video signal by a D/A converter 19 so that the image in accordance with the image data is displayed on a display 20 which may be a CRT or an LCD, for example.

In addition, although not shown, the microcomputer 16 includes a central processing unit (CPU), a ROM which is connected to the CPU and stores a program in accordance with a transmission control procedure to be described later, and a RAM which is connected to the CPU and includes a timer area or region for a time-counting operation and flag areas or regions necessary for controlling.

To the microcomputer 16, a key pad 22 is further connected. The key pad 22 includes a ten-key 24 similar to a normal or conventional audio telephone, an image data sending key 26, and a transmission speed changing key 28. A transmission mode changing key 30 and a polling key 31 may be provided on the key pad 22 as necessary. In addition, each of the transmission mode changing key 30 and the polling key 31 is a key an operated state of which is held until the same key is operated again.

The video telephone 10 further includes a network control unit 32 which includes a relay 34. The relay 34 is controlled by the microcomputer 16 so that a telephone circuit 36 is selectively connected to an audio telephone 38 or a modem 40. When the telephone circuit 36 is switched to the audio telephone 38 by the relay 34, it is possible to make a telephone conversation or audio communication with the other party by the audio telephone 38 through the telephone circuit 36 as in the normal or conventional telephone. Inversely, if the telephone circuit 36 is switched by the relay 34 so as to be connected to the modem 40, it is possible to send or receive the image data through the telephone circuit 36.

In addition, the modem 40 includes a DTMF (Dual Tone Multi-Frequency) signal generator 40a for generating DTMF signals. The DTMF signal generator 40a can generate sixteen kinds of DTMF signals each having a different frequency as in the conventional telephone. Twelve kinds of the DTMF signals out of sixteen kinds of DTMF signals are utilized for the ten-key 24, each of which corresponding to respective one of twelve keys of the ten-key 24. A portion or all of the remaining four DTMF signals, that is, DTMF-A signal, DTMF-B signal, DTMF-C signal and DTMF-D signal can be utilized in a transmission control procedure of the embodiment.

Furthermore, the DTMF signal from a video telephone of the other party is received by a DTMF signal receiver 42 through the telephone circuit 36 and the network control unit 32, and frequencies of a received DTMF signal are identified in the DTMF signal receiver 42. A signal is outputted correspondingly to respective one of the received DTMF signals from the DTMF signal receiver 42 and applied to the microcomputer 16.

In the embodiment described later, the video or visual telephones 10 as shown in FIG. 2 are used as an apparatus of sending part and an apparatus of receiving part, respectively.

Figure 3:
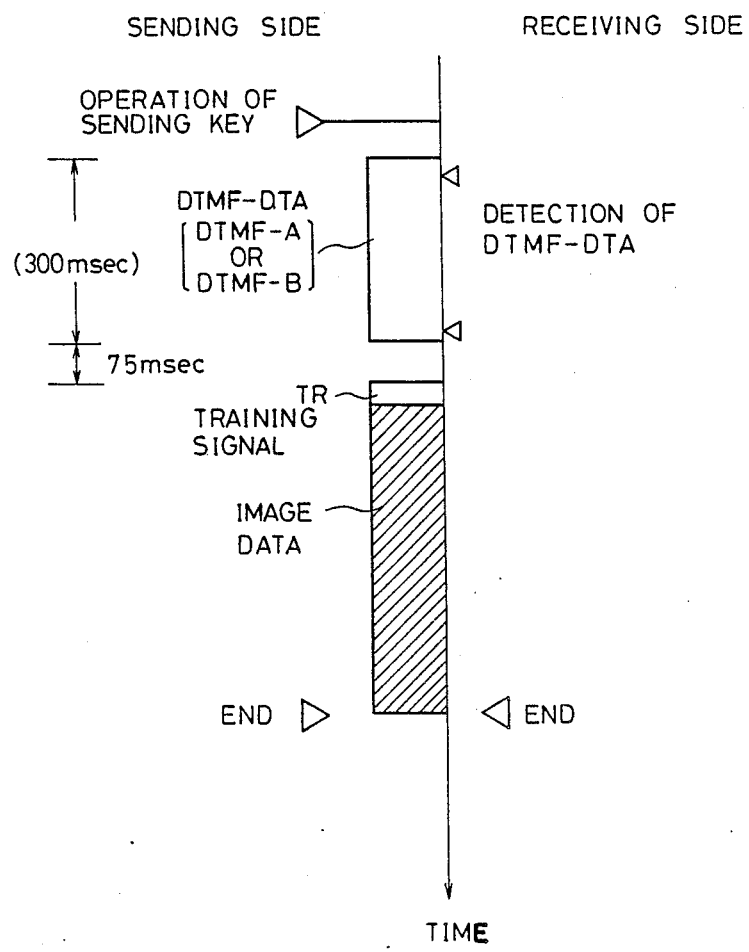
FIG. 3 is an illustrative view showing a transmission control procedure in accordance with one embodiment of the present invention.

With referring to FIG. 3, a transmission control procedure in accordance with one embodiment of the present invention will be roughly described. In the video telephone of sending part, when the image data sending key 26 is operated, in response thereto, a signal DTMF-DTA, that is, DTMF-A signal or DTMF-B signal is sent for a predetermined time period which is slightly longer than a time period necessary for receiving a signal being sent from the video telephone of sending part by the video telephone of receiving part and for prevent an erroneous operation due to an audio or sound signal, for example, 300 milliseconds. Thereafter, after forming of a non-signal state for a predetermined time period which is slightly longer than a time period necessary for changing a transmission speed of the modem 40 and/or for changing-over the relay 34, for example, 75 milliseconds, the image data to which a training signal TR is added at the leading head thereof is sent at a transmission speed of 4,800 bps or 2,400 bps. On the other hand, in the video telephone of receiving part, if the DTMF-A signal or DTMF-B signal being sent from the video telephone of sending part is continuously received or detected for a predetermined time period which is slightly longer than a time period necessary for determining by the microcomputer 16 whether or not the received signal is an effective DTMF signal, for example, 250 milliseconds, in response thereto, the modem is brought in a ready state for receiving at a transmission speed of 4,800 bps or 2,400 bps so that the image data being sent from the video telephone of sending part is received.

Figure 4:
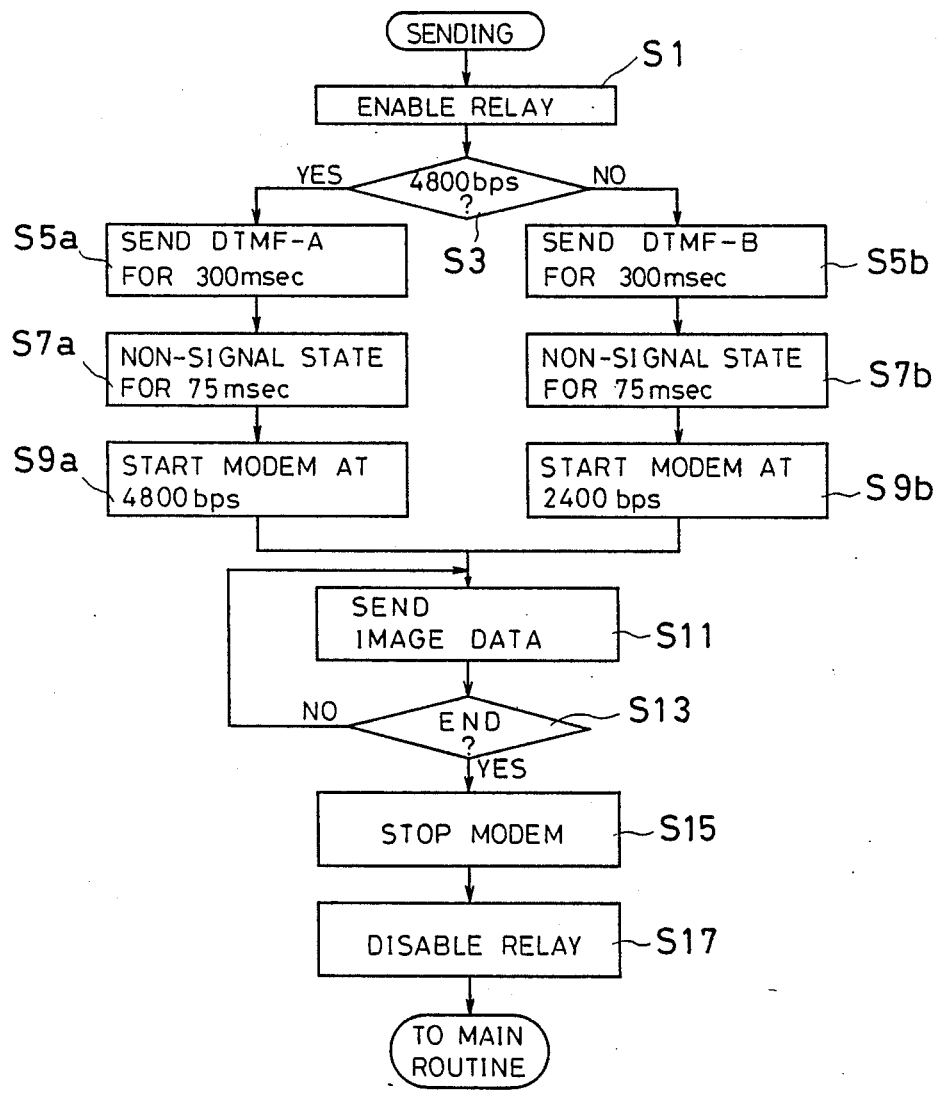
FIG. 4 is a flowchart showing an operation of a video or visual telephone of sending part in accordance with FIG. 3 embodiment.

More specifically, in the state where the telephone circuit 36 is established in association with the video telephone of receiving part, when the image data sending key 26 is operated in the video telephone of sending part, a sending routine as shown in FIG. 4 is executed. In the first step S1, in the video telephone of sending part, the relay 34 included in the network control unit 32 is enabled by the microcomputer 16 in response to an operation of the image data sending key 26. Accordingly, a modem 40 is connected to the telephone circuit 36.

In the next step S3, a transmission speed being set by the user at that time is recognized by the microcomputer 16 in accordance with a state of the transmission speed changing key 28 included in the key pad 22. Then, when the set transmission speed is 4,800 bps, in the step S5a, the DTMF signal generator 40a included in the modem 40 is started by the microcomputer 16, and the aforementioned DTMF-A signal is sent for 300 milliseconds as the signal DTMF-DTA which is to be sent prior to the image data. Succeedingly, after the non-signal state for 75 milliseconds as shown in FIG. 3 is formed in the step S7a, the modem 40 is set at a transmission speed of 4,800 bps and started in the step S9a. On the other hand, if the transmission speed is set at 2,400 bps, likewise the previous step S5a, the DTMF signal generator 40a is started and the DTMF-B signal as the signal DTMF-DTA is sent for 300 milliseconds by the microcomputer 16 in the step S5b. Then, after forming the non-signal state for 75 milliseconds in the step S7b, in the step S9b, the modem 40 is set at the transmission speed of 2,400 bps and started.

After the previous step S9a or S9b, in the step S11, the image data which has been taken by the CCD camera 12 and stored in the video memory 18 is sent to the telephone circuit 36 through the modem 40 under the control of the microcomputer 16. If it is determined that the end of the image data is completed in the step S13, in the steps S15 and S17, the microcomputer 16 stops the modem 40 to operate and disables the relay 34 included in the network control unit 32.

Figure 5:
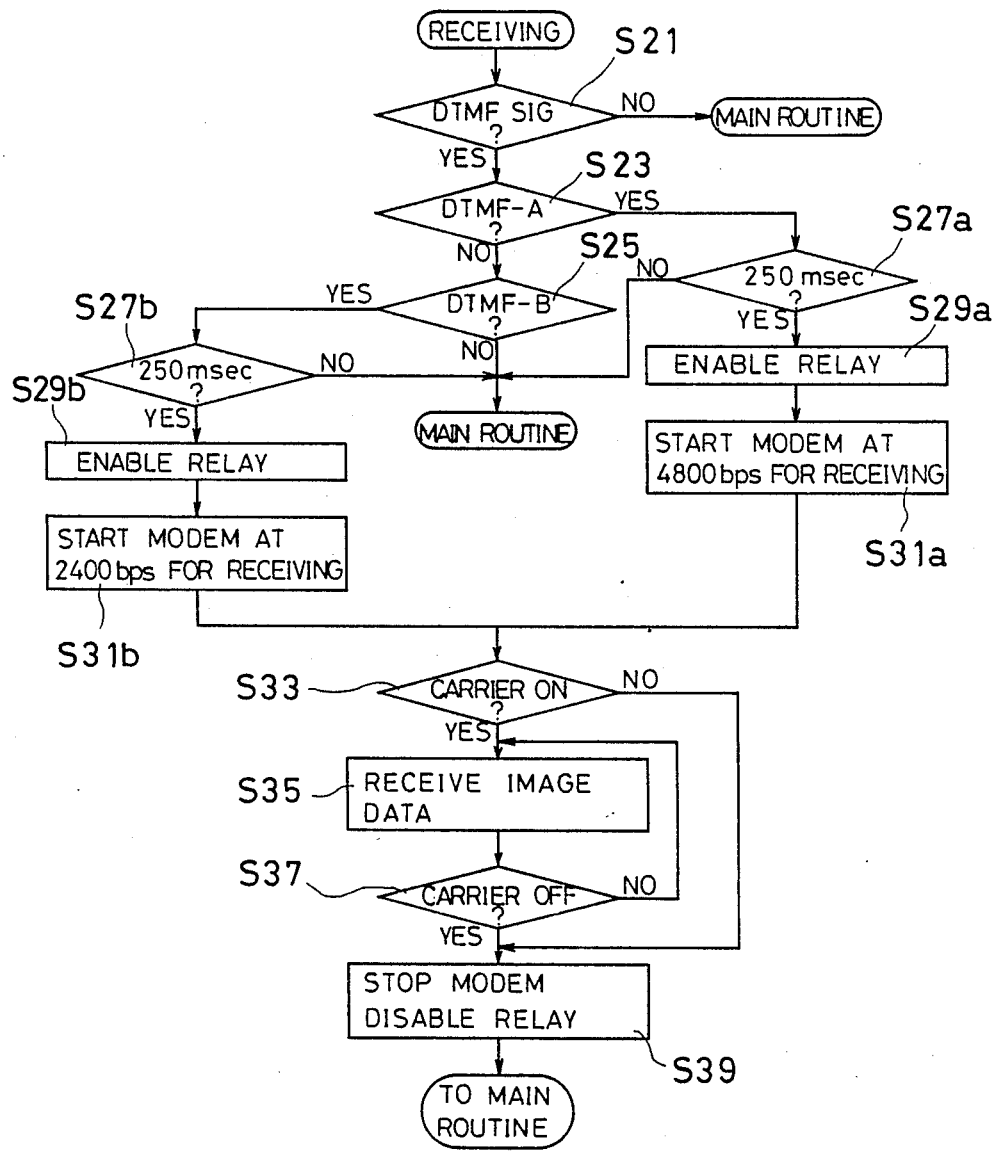
FIG. 5 is a flowchart showing an operation of a video or visual telephone of receiving part in accordance with FIG. 3 embodiment.

On the other hand, in the video telephone of receiving part, in the state where the image data sending key 26 is not operated, the microcomputer 16 always watches an output of the DTMF signal receiver 42. Then, if the DTMF signal is received or detected in the first step S21 as shown in FIG. 5, in the succeeding steps S23 and S25, the microcomputer 16 determines based upon the output of the DTMF signal receiver 42 whether or not the detected DTMF signal is the signal DTMF-DTA, that is, DTMF-A signal or DTMF-B signal.

When the DTMF-A signal is detected, in the next step S27a, it is determined whether or not the DTMF-A signal is continuously received or detected for a predetermined time period, for example, 250 milliseconds. If the DTMF-A signal is continuously detected for 250 milliseconds, in the next step S29a, the relay 34 included in the network control unit 32 is enabled by the microcomputer 16. Also, in the next step S31a, the modem 40 is brought in a state capable of receiving the image data at the transmission speed of 4,800 bps. If the DTMF-B signal is detected in the above described steps, after the steps S27b and S29b similar to the previous steps S27a and S29a, the modem 40 is set at the transmission speed of 2,400 bps by the microcomputer 16 in the step S31b.

After the step S31a or S31b, in the step S33, the microcomputer 16 determines whether or not the image data is received within 300 milliseconds after starting of the modem 40. If a carrier signal of the image data is detected within the time period, the image data is received through the modem 40 in the step S35. The received image data is stored in the video memory 18 and displayed on the display 20 (FIG. 2) as an image.

Then, in the step S37, if it is determined that no carrier signal of the image data is received due to the end of the image data being sent from the video telephone of the sending part, the relay 34 is disabled by the microcomputer 16 in the next step S39. Thus, in the embodiment as shown in FIG. 4 and FIG. 5, it is possible to transmit the image data in accordance with the transmission control procedure as shown in FIG. 3. In this case, the DTMF-A signal or DTMF-B signal is utilized for designating the transmission speed of 4,800 bps or 2,400 bps.

In addition, when sending of the image data is completed in accordance with FIG. 4 and FIG. 5, thereafter, it is possible to make a normal telephone conversation utilizing the respective audio telephones 38 between the video telephones of the both parts, whereby confirmation of presence or absence of transmission error can be made through such telephone conversation. If it is confirmed through the telephone conversation that the transmission error takes place at the transmission speed of 4,800 bps, the transmission speed is changed at 2,400 bps through an operation of the transmission speed changing key 28 by the user who operates the video telephone of sending part, and thereafter the image data may be sent again in accordance with the same procedure as described above.

Figure 6:
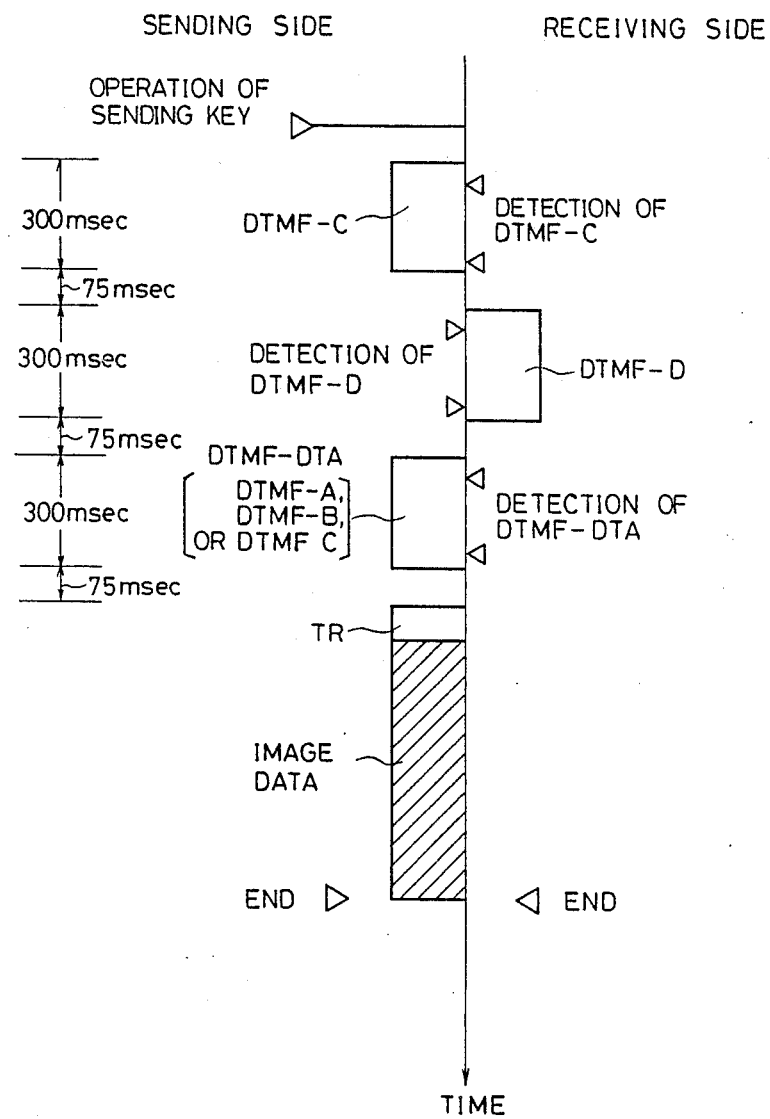
FIG. 6 is an illustrative view showing a transmission control procedure in accordance with another embodiment of the present invention.

With reference to FIG. 6, a transmission control procedure in accordance with another embodiment of the present invention will be simply described. The embodiment shown is suitable for sending and receiving a color image data between video telephones of the both parties each of which is capable of displaying color image. Then, in taking compatibility between the video telephone which can receive only monochrome image data as shown in FIG. 3 through FIG. 5 into consideration, prior to sending the signal DTMF-DTA, that is, DTMF-A signal or DTMF-B signal and the image data as shown in FIG. 3, a command signal for designating a transmission mode which represents that the color image data will be sent is sent from the video telephone of sending part by utilizing a specified tone signal, for example, DTMF-C signal. If the video telephone of receiving part is the color video telephone, a further specified tone signal, for example, DTMF-D signal is returned from the video telephone of receiving part so as to notify to the video telephone of sending part that the color image data can be received. Thereafter, a transmission control procedure similar to FIG. 3 embodiment will be executed.

Figure 7A:
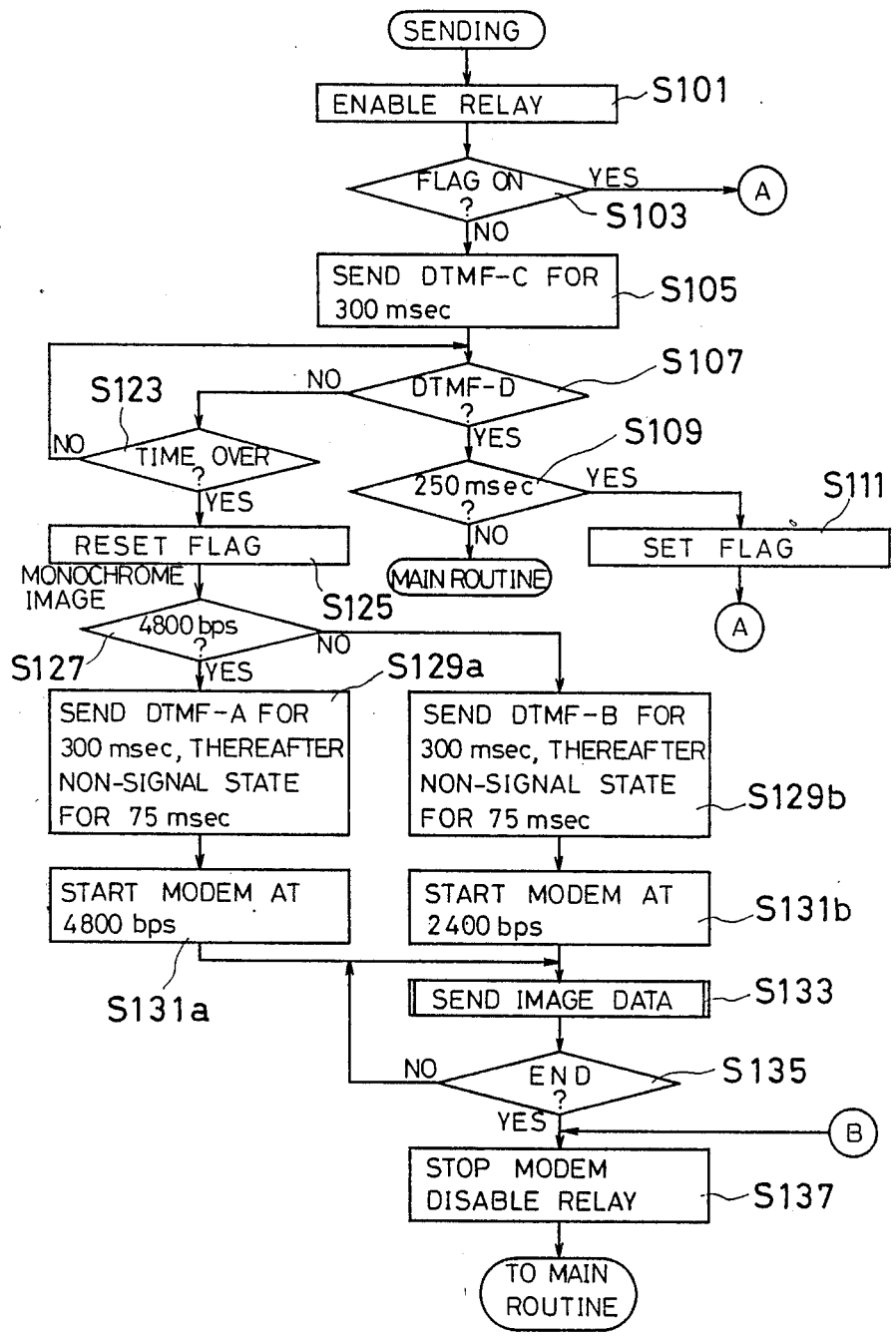
FIG. 7A and FIG. 7B are flowcharts showing an operation of a video or visual telephone of sending part in accordance with FIG. 6 embodiment.
Figure 7B:
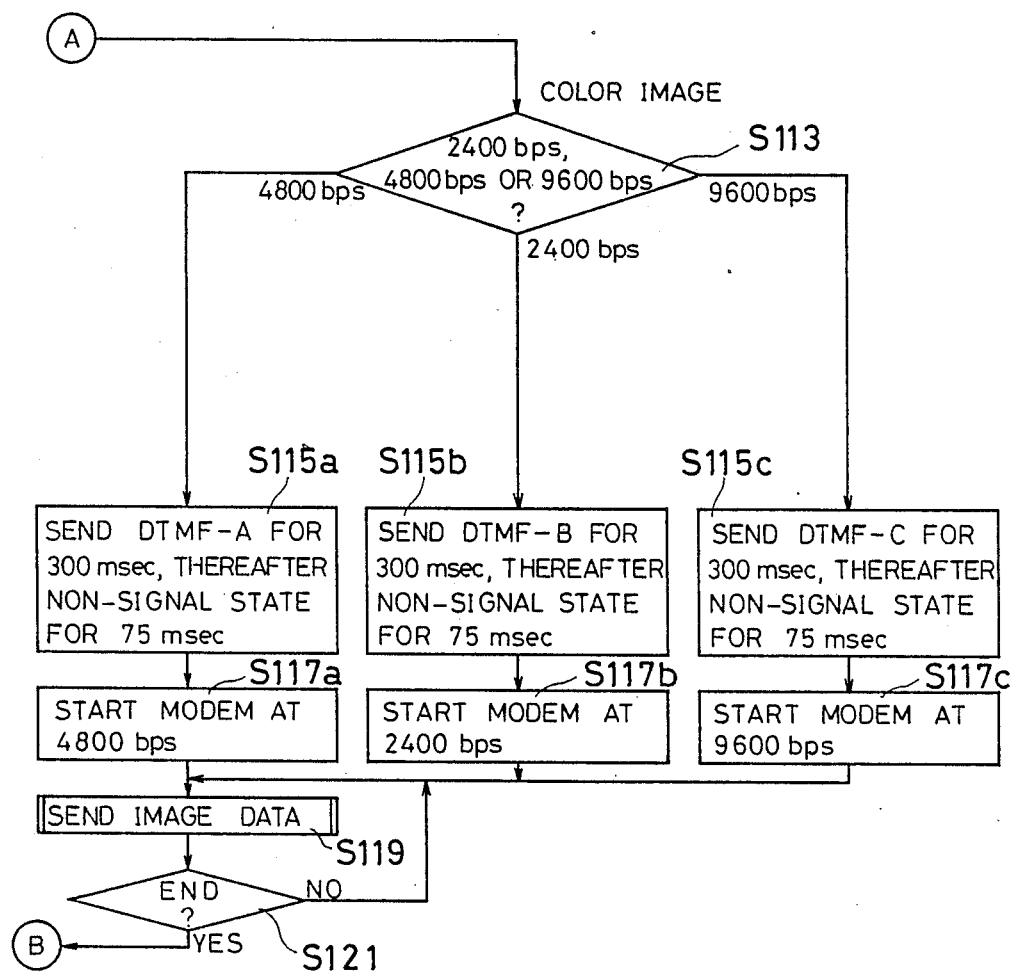

More specifically, in the video telephone of sending part, when the image data sending key 26 as shown in FIG. 2 is operated, a sending routine as shown in FIG. 7A and FIG. 7B is executed. After the relay 34 included in the network control unit 32 is enabled by the microcomputer in the first step S101, in the step S103, the microcomputer 16 determines whether or not confirmation of the transmission mode by utilizing the DTMF-C signal and DTMF-D signal as shown in FIG. 6 has been made in association with the video telephone of receiving part. Such determination can be made by setting a suitable flag, for example, a transmission mode confirmation flag described later in the RAM (not shown) of the microcomputer 16.

If the confirmation of the color image data transmission mode has not been completed, in the succeeding step S105, the DTMF signal generator 40a is started by the microcomputer 16 and the DTMF-C signal representing the transmission mode for transmitting the color image is sent for 300 milliseconds. When the DTMF-C signal is thus sent from the video telephone of sending part, the acknowledge signal, that is, the DTMF-D signal is to be returned from the video telephone of receiving part if the same is the color video telephone. Therefore, in the next step S107, the microcomputer 16 determines whether or not the DTMF-D signal is returned from the video telephone of receiving part based upon the output of the DTMF signal receiver 42. Then, if the DTMF-D signal is detected, in the next step S109, it is determined whether or not the DTMF-D signal is continuously received for 250 milliseconds. If the DTMF-D signal is continuously detected for 250 milliseconds, in the next step S111, the microcomputer 16 of the video telephone of sending part sets the transmission mode confirmation flag in the RAM on the assumption that the confirmation of the transmission mode had been made.

Thereafter, the process proceeds to the step S113 as shown in FIG. 7B, in that step, the microcomputer 16 determines based upon a state of the transmission speed changing key 28 (FIG. 2) at that time which of the transmission speed is set by the user. If the set transmission speed is 4,800 bps, in the step S115a, the non-signal state for 75 milliseconds is formed after the DTMF-A signal is sent for 300 milliseconds, and then in the step S117a, the transmission speed of the modem 40 is set as 4, 800 bps and the modem is started. If the set transmission speed is 2,400 bps, the steps S115b and S117b are executed so that the DTMF-B signal is sent for 300 milliseconds, and the non-signal state for 75 milliseconds is continued, and thereafter the modem 40 is started at 2,400 bps. In addition, if the set transmission speed is 9,600 bps, the step S115c and S117c are executed. This means that the non-signal state for 75 milliseconds is formed after the signal DTMF-DTA, that is, DTMF-C signal which is representative of the transmission speed of 9,600 bps is sent for 300 milliseconds, and thereafter the modem 40 is started at 9,600 bps in the step S117c.

After the step S117a, S117b or S117c, in the step S119, the microcomputer 16 sends the image data from the video memory 18 through the modem 40 at the set transmission speed and continues to send until the end of the image data is detected in the step S121.

Thus, if the transmission mode confirmation flag has been set in the step S103, or the transmission mode confirmation flag is set in the step S111, the color image data transmission mode is selected in the step S113. However, in the case where the DTMF-D signal, that is, the acknowledge signal from the video telephone of receiving part was not received by the video telephone of sending part in the previous step S107, in the step S123 as shown in FIG. 7A, it is determined whether or not a predetermined time period has been counted, and if the DTMF-D signal is not detected within the predetermined time period, the microcomputer 16 resets the transmission mode confirmation flag in the next step S125 on the assumption that confirmation of the transmission mode could not been made.

Thus, in the state where the transmission mode confirmation flag is reset, the color image data transmission mode is not selected any more, and therefore, the process proceeds to the monochrome image data transmission mode of the succeeding step S127. In the step S127, it is determined that the transmission speed being set at this time is 4,800 bps or 2,400 bps. If the transmission speed is 4,800 bps, the step S129a and S131a similar to the steps S5a through S9a as shown in FIG. 4 are executed. If 2,400 bps, the steps S129b and S131b similar to the steps S5b through S9b. Thereafter, the monochrome image data is sent in the step S133 until the end of the image data is detected in the step S135.

When the end of the image data is determined in the step S121 as shown in FIG. 7B or in the step S135 as shown in FIG. 7A, the modem 40 is stopped to operate and the relay 34 is disabled by the microcomputer 16 in the step S137.

Figure 8A:
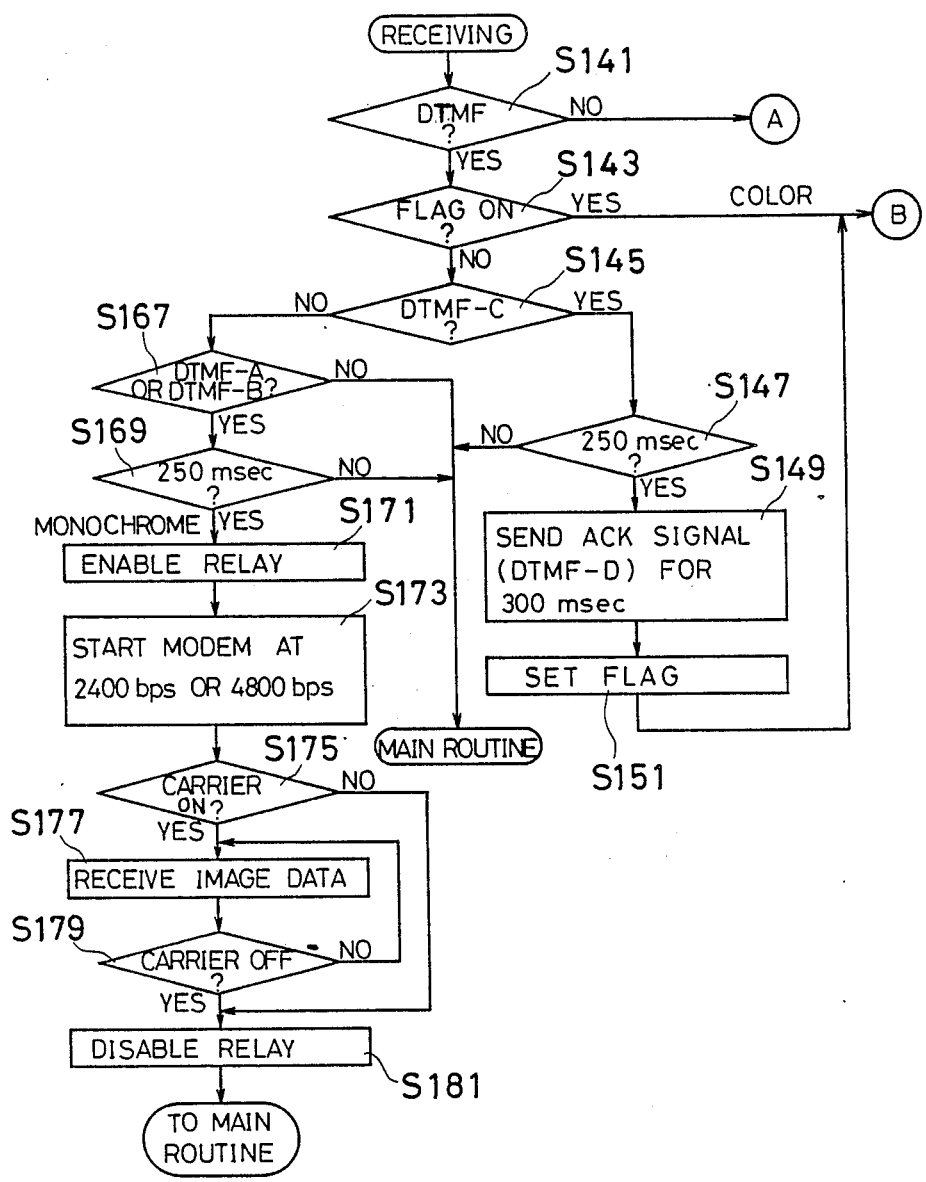
FIG. 8A and FIG. 8B are flowcharts showing an operation of a video or visual telephone of receiving part in accordance with FIG. 6 embodiment.
Figure 8B:
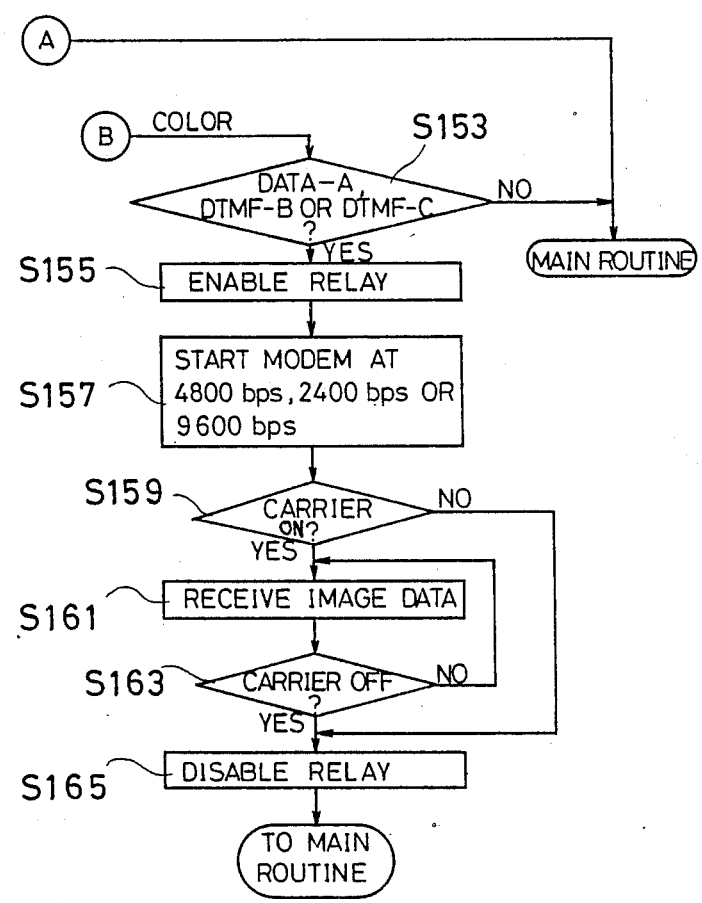

If the DTMF signal is detected in the first step S141 as shown in FIG. 8A, in the next step S143, the microcomputer 16 of the video telephone of receiving part determines whether or not confirmation of the transmission mode has been completed between the video telephones of the both parties with reference to the transmission mode confirmation flag of the RAM (not shown) of the microcomputer 16. If the confirmation of the transmission mode has not been completed, in the step S145, the microcomputer 16 determines whether or not the DTMF-C signal is detected by the DTMF signal receiver 42. If the DTMF-C signal is detected, in the next step S147, the microcomputer 16 determines whether or not the DTMF-C signal is continuously detected for 250 milliseconds. If the DTMF-C signal is continuously detected for 250 milliseconds in the steps S145 and S147, the DTMF signal generator 40a included in the modem 40 is started so that the acknowledge signal, that is, the DTMF-D signal is sent for 300 milliseconds. Thereafter, after the transmission mode confirmation flag is set in the step S151, the process proceeds to the step S153 of the color image data transmission mode (as shown in FIG. 8B).

In the step S153, the microcomputer 16 determines whether or not either one of the DTMF-A signal, DTMF-B signal or DTMF-C signal is continuously received or detected for 250 milliseconds as the signal DTMF-DTA. If either one of these three DTMF signals is detected, in the step S155, the relay 34 included in the network control unit 32 is enabled. Thereafter, the modem 40 is started in the step S157. At this time, if the DTMF-A signal is detected in the step S153, the modem 40 is set at the transmission speed of 4,800 bps. In addition, the transmission speed of the modem 40 is set at 2,400 bps if the DTMF-B signal is detected, and if the DTMF-C signal is detected, the transmission speed of the modem 40 is set at 9,600 bps. Thereafter, the microcomputer 16 executes the steps S159 through S165 similar to the steps S33 through S39 as shown in FIG. 5.

Likewise the case where the video telephone of sending part is the video telephone which can send only the monochrome image, if the DTMF-C signal, that is, the signal for designating the color image data transmission mode from the video telephone of sending part is not detected in the previous step S145, the microcomputer 16 determines whether or not the DTMF-A signal or DTMF-B signal is continuously detected for 250 milliseconds in the steps S167 and S169. If any one of the DTMF-A signal or DTMF-B signal is continuously detected for 250 milliseconds, the microcomputer 16 resets the aforementioned transmission mode confirmation flag so as to set the monochrome image data transmission mode, and the steps S173 through S181 are executed after the relay 34 is enabled in the step S171. More specifically, if the DTMF-A signal is detected in the step S167, the modem 40 is set at the transmission speed of 4,800 bps and started, and if the DTMF-B signal is detected, the modem 40 is started at the transmission speed of 2,400 bps. The steps S175 through S181 are similar to the previous steps S159 through S165 (as shown in FIG. 8B).

In this embodiment, when the confirmation of the transmission mode has been made between the video telephones of the both parties, that is, when the transmission mode confirmation flag is set, the confirmation of the transmission mode by sending and receiving the DTMF-C signal and the DTMF-D signal as shown in FIG. 6 is not made any more. In this case, the process in the video telephone of sending part proceeds to the step S113 immediately after the step S101, and the process in the video telephone of receiving part proceeds to the step S153 immediately after the step S143.

Thus, in this embodiment, it is possible to send the color image data at the transmission speed of any one of 2,400 bps, 4,800 bps or 9,600 bps. However, in the case where the video telephone of sending part or the video telephone of receiving part is not the color video telephone, a default transmission mode, that is, the monochrome image transmission mode is forcedly set by passing through the step S127 or S167.

Figure 9:
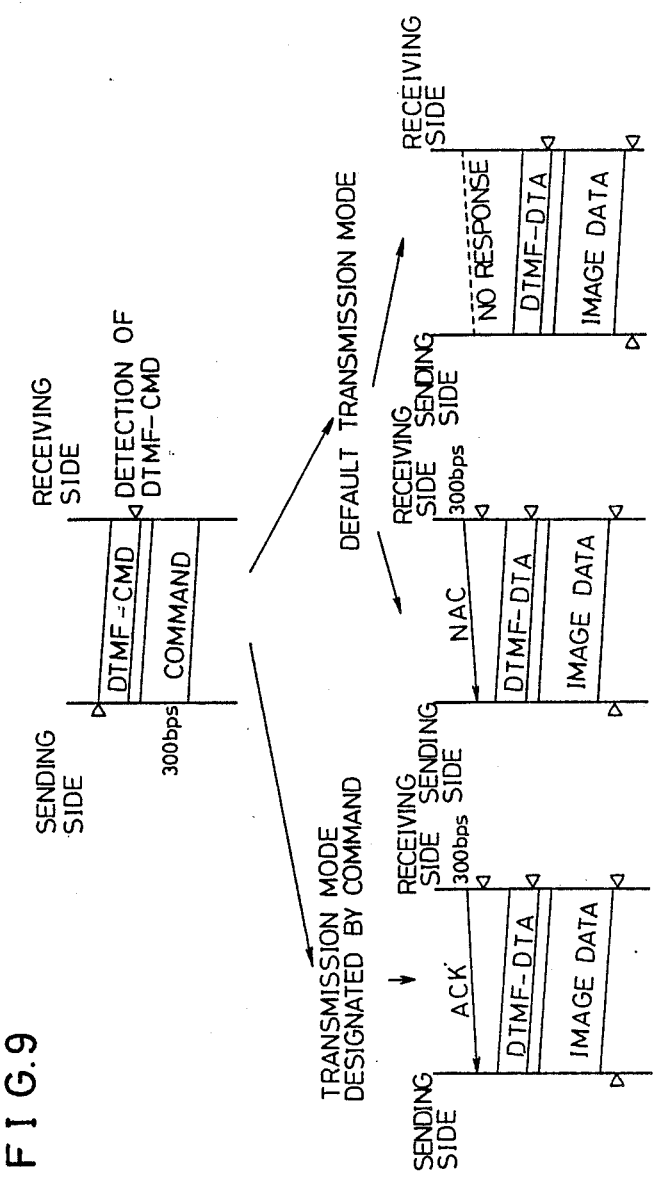
FIG. 9 is an illustrative view showing a transmission control procedure in accordance with a still another embodiment of the present invention.

With reference to FIG. 9, a transmission control procedure in accordance with another embodiment of the present invention is roughly described. In this embodiment, in stead of the DTMF-C signal designating the transmission mode as shown in FIG. 6, in order to selectively designate any one of larger numbers of the transmission modes, after a signal DTMF-CMD notifying that the command signal is succeedingly sent, any one of commands as indicated in the next table is sent from the video telephone of sending part.

TABLE

| command | transmission mode and meanings | | |
|---------|--------|----------|----------------|
| COL96   | V29    | 9600 bps | color |
| COL72   | V29    | 7200 bps | color |
| COL48   | V27ter | 4800 bps | color |
| COL24   | V27ter | 2400 bps | color |
| BW48    | V27ter | 4800 bps | monochrome |
| BW24    | V27ter | 2400 bps | monochrome |
| MEMO    | V21    | 300 bps  | character code |
| POL     | polling (+transmission speed) | | |
| ACK     | acknowledge command | | |
| NAC     | negative acknowledge command | | |
| ESC     | expansive function | | |

Such commands are transmitted for setting or confirming the transmission mode between the video telephones of the both parties likewise the DTMF-C signal and the DTMF-D signal which are transmitted prior to the signal DTMF-DTA in the previous embodiment shown in FIG. 6 through FIG. 8B. Therefore, if the acknowledge command ACK is returned from the video telephone of receiving part against the sent command signal, the image data is sent in accordance with the transmission mode being set by the command signal as shown in FIG. 9. However, in the case where the negative acknowledge command NAC is returned from the video telephone of receiving part or no responsive signal is returned, the default transmission mode is forcedly set and the image data is sent in accordance with a predetermined transmission mode.

Figure 10:
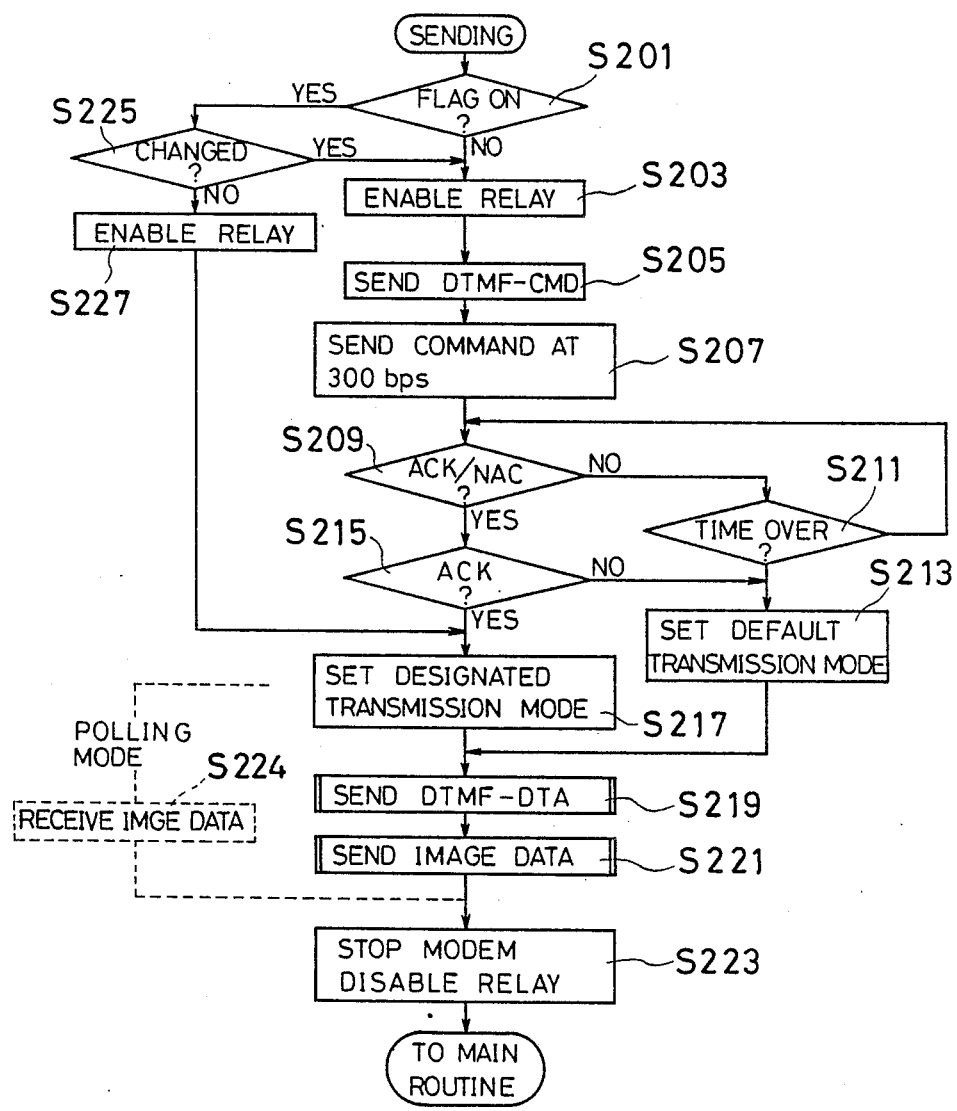
FIG. 10 is a flowchart showing an operation of a video or visual telephone of sending part in accordance with FIG. 9 embodiment.

More specifically, in the video telephone of sending part, in the first step S201 as shown in FIG. 10, in response to an operation of the image data sending key 26, the microcomputer 16 determines whether or not the transmission mode confirmation flag has been set in the RAM. If the flag has not been set, it is necessary to confirm the transmission mode between the video telephones of the both parties, and therefore, in the step S203, the relay 34 is enabled, and in the step S205, the DTMF signal generator 40a included in the modem 40 is started by the microcomputer 16 so that the signal DTMF-CMD, for example, DTMF-A signal prior to sending the command signal is sent for a predetermined time period, succeedingly, in the step S207, the command signal (any one of the command data indicated in the previous table) according to the transmission mode being set by the user at this time is sent through the modem 40 at the transmission speed of 300 bps, for example. Then, the microcomputer 16 waits any one of the acknowledge command ACK or negative acknowledge command NAC is returned in the step S209. If neither the acknowledge command ACK nor the negative acknowledge command NAC is returned after lapse of a predetermined time period, after the step S211, the microcomputer 16 forcedly sets the default transmission mode in the step S213. In addition, the default transmission mode is, in this embodiment, a mode in which the monochrome image data is sent at 4,800 bps.

If either the acknowledge command ACK or the negative acknowledge command NAC is returned from the video telephone of receiving part, in the next step S215, the microcomputer 16 determines whether or not it is the acknowledge command ACK. Then, when not the acknowledge command ACK the process proceeds to the previous step S213 so that the default transmission mode is set.

When the acknowledge command ACK, in the next step S217, the microcomputer 16 sets the transmission mode confirmation flag on the assumption that the transmission mode is set or established by the command signal which has been sent in the previous step S207. Thereafter, the steps S219 through S223 will be executed. These steps S219 through S223 are equivalent to the steps S3 through S17 in the embodiment shown in FIG. 4, or the steps S115a (or S115b or S115c) through S137 or the steps S129a (or S129b) through S137 in the embodiment shown in FIG. 7A and FIG. 7B.

In the case where the transmission mode confirmation flag is set in the step S201, in the next step S225, the microcomputer 16 determines whether or not the transmission mode is changed through an operation of the transmission mode changing key 30 (FIG. 2). Then, if the transmission mode is changed, the process after the previous step S203 is executed, and if the transmission mode is not changed, after the relay 34 is enabled in the step S227, the process after the step S217 is executed.

In addition, in the case where the default transmission mode is set in the step S213, after the transmission mode confirmation flag is reset, the monochrome image data is sent at 4,800 bps in the steps S219 through S223.

Furthermore, in the polling mode, instead of the steps S219 and S221, the step S224 is executed so that the image data being sent from the video telephone of receiving part is received by the video telephone of sending part.

Figure 11:
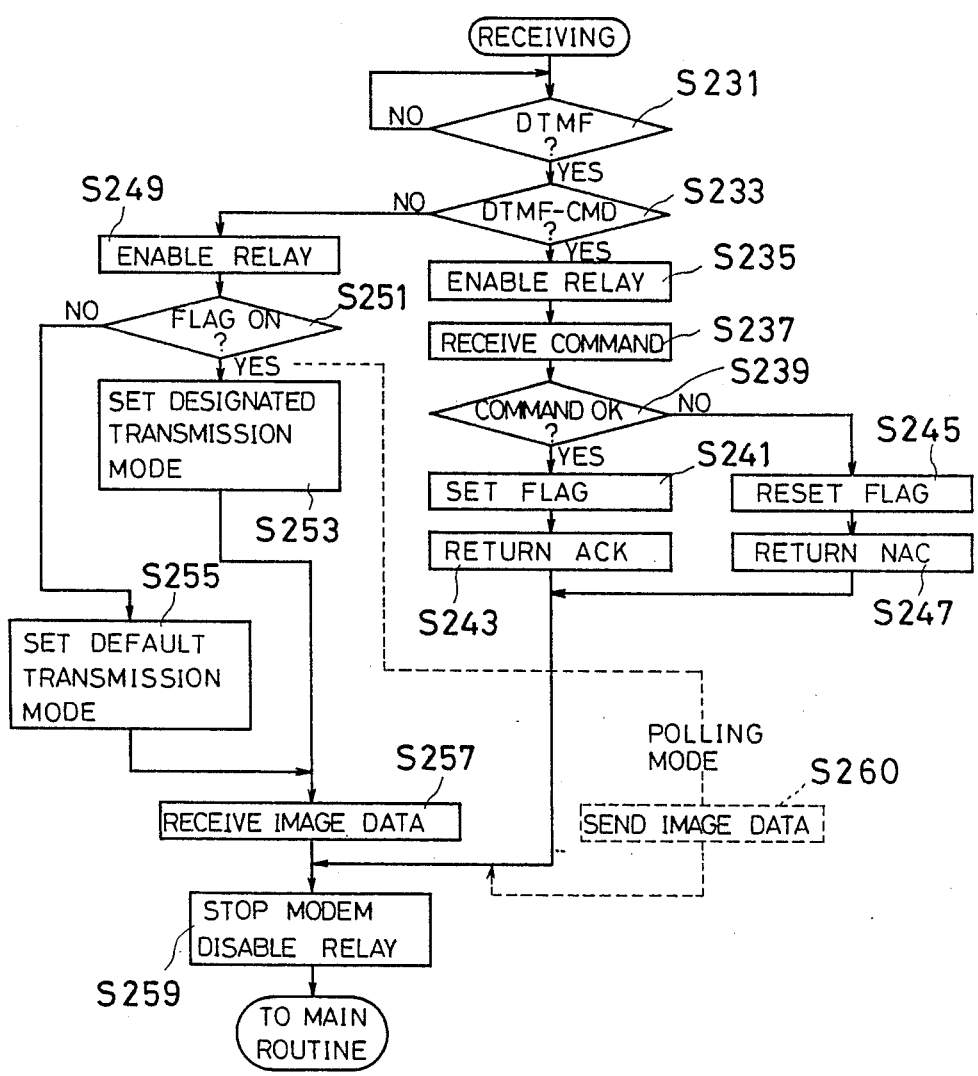
FIG. 11 is a flowchart showing an operation of a video or visual telephone of receiving part in accordance with FIG. 9 embodiment.

In the first step S231 of a receiving routine as shown in FIG. 11, the microcomputer 16 determines based upon the output of the DTMF signal receiver 42 whether or not any of the DTMF signals is detected. If the received DTMF signal is detected, in the step S233, the microcomputer 16 determines that the DTMF signal is the signal DTMF-CMD in association with the command signal or the signal DTMF-DTA in association with the image data. If the DTMF signal is the DTMF-A signal as the signal DTMF-CMD, the relay 34 is enabled in the step S235, and in the next step S237, it is waited that the command signal is sent from the video telephone of sending part.

When that command signal is received, in the next step S239, the microcomputer 16 determines whether or not the transmission mode which is designated by the command signal can be received. If it is possible to receive the image data in accordance with the transmission mode being designated by the command signal, the transmission mode confirmation flag is set in the step S241, and thereafter, acknowledge command ACK is returned to the video telephone of sending part at 300 bps in the step S243. If it is impossible to receive the image data in accordance with the transmission mode being designated by the command signal, after the transmission mode confirmation flag is reset in the step S245, the negative acknowledge command NAC is returned at 300 bps in the step S247.

Thereafter, if the image data will be sent from the video telephone of sending part, in the step S231, the DTMF signal is detected again. At this time, the DTMF signal is the signal DTMF-DTA in association with the image data, and therefore the process proceeds to the step S249. After the relay 34 is enabled in the step S249, in the step S251, the microcomputer 16 determines whether or not the transmission mode confirmation flag is set. If the transmission mode confirmation flag is set, in the step S253, the modem 40 is set in the transmission mode being designated. Inversely, if the transmission mode confirmation flag is reset, in the step S255, the default transmission mode is forcedly set.

Then, after the step S253 or S255, in the step S257, likewise the previous embodiment, the image data being sent from the video telephone of sending part is received. Then, in the step S259, the relay 34 is disabled and the modem 40 is stopped to operate.

In addition, in the polling mode, instead of the steps S253 through S257, the step S260 is executed so that the image data is sent from the video telephone of receiving part to the video telephone of sending part.

Thus, in this embodiment shown, the image data is sent or received after the transmission mode is confirmed or established between the video telephones of the both parties by utilizing the plurality kinds of the code data or command signals. If the transmission mode can not be confirmed or established, the default transmission mode is forcedly set.

Figure 12:
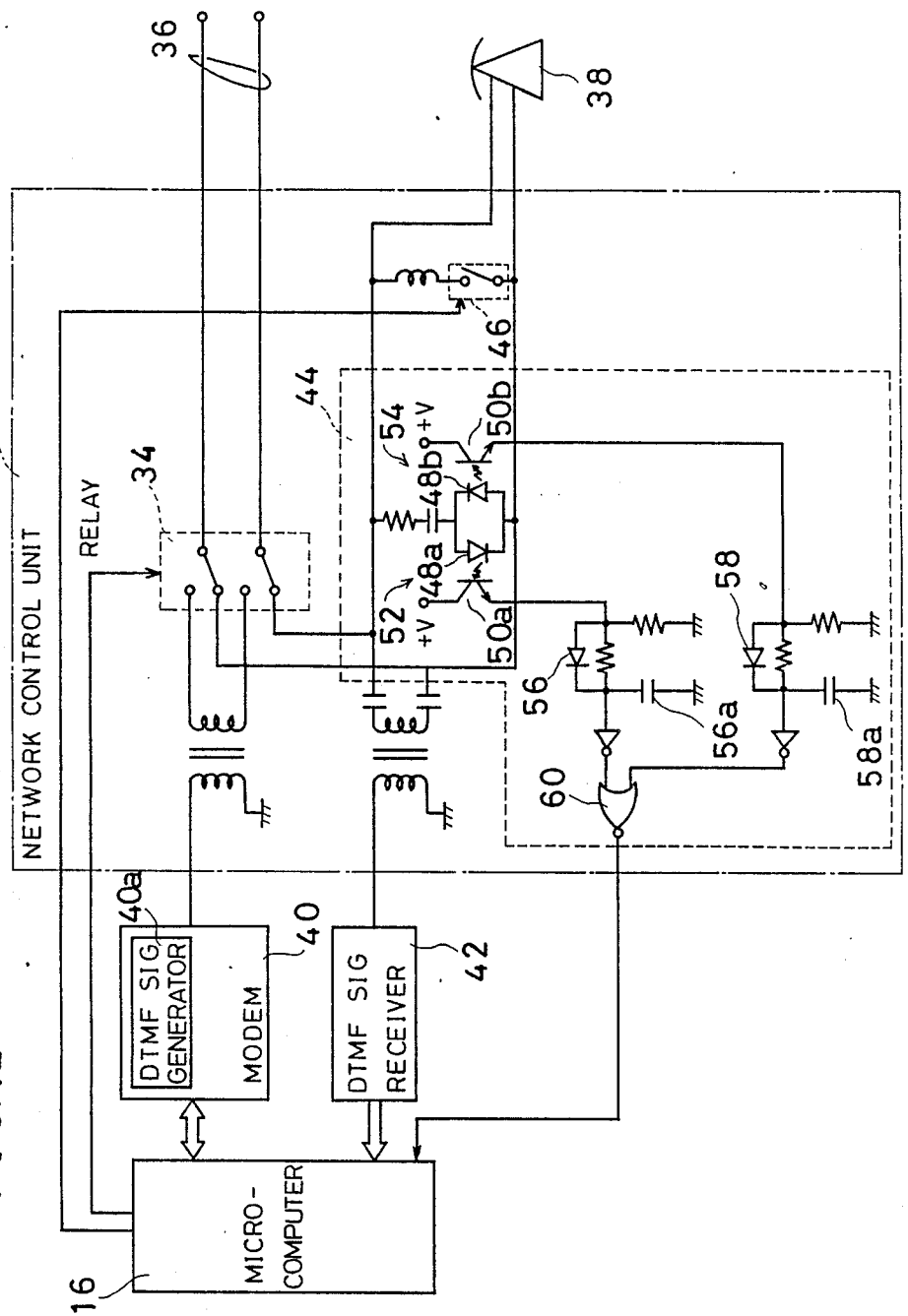
FIG. 12 is a circuit diagram showing a major portion of a video or visual telephone utilized in the other embodiment in accordance with the present invention.

With reference to FIG. 12, in this embodiment shown, in order to perform a polling function, a ringer detection circuit 44 is provided in the network control unit 32. Then, when a ringer signal is detected by the ringer detection circuit 44, a detection signal is applied to the microcomputer 16. When the ringer detection signal is received, the microcomputer 16 enables a relay 46 so as to close the telephone circuit 36 in connection to a circuit for a direct current voltage. The polling function can be performed by these ringer detection circuit 44 and the relay 46.

Now, a detail description will be made on the ringer detection circuit 44. The ringer detection circuit 44 is inserted between the audio telephone 38 and the relay 34. Light emitting diodes 48a and 48b are connected between two lines, which are reverse polarity nd in parallel with each other. Photo-transistors 50a and 50b are respectively optically coupled to the light emitting diodes 48a and 48b so as to construct photo-couplers 52 and 54. Signals from the photocouplers 52 and 54 are outputted through diodes 56 and 58, respectively. The outputs from the diodes 56 and 58 are inverted by inverters and applied to inputs of a NOR gate 60. When the ringer signal is sent from the video telephone of the other party, the two lines becomes alternately reverse polarity for each predetermined time period, and the high level signal is alternately outputted from the photo-couplers 52 and 54. Since the high level outputs are inputted to the NOR gate 60 through the diodes 56 and 58 and the inverters, if the ringer signal is received, the ringer detection signal of the high level is outputted from the NOR gate 60. In addition, during when the high level signals are not outputted from the photo-couplers 52 and 54, the voltage level of respective outputs can be maintained by capacitors 56a and 58a which are connected to the diodes 56 and 58.

Figure 13:
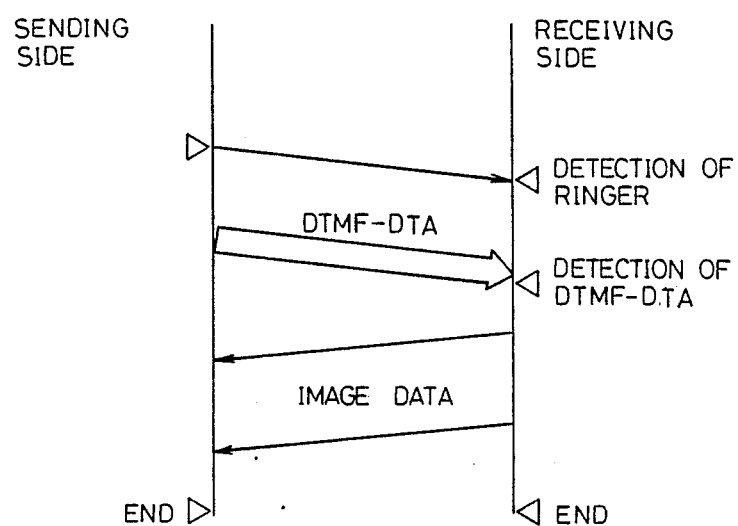
FIG. 13 is an illustrative view showing a transmission control procedure in accordance with the other embodiment of the present invention.

With reference to FIG. 13, a transmission control procedure in the case where the polling function is performed by utilizing FIG. 12 embodiment will be described simply. Meanwhile, in the following, the polling function is described on the assumption that the FIG. 12 embodiment is applied to the embodiment shown in FIG. 3 through FIG. 5. However, it is pointed out in advance that the same manner is applicable to the embodiments shown in FIG. 6 through FIG. 8B or FIG. 9 through FIG. 11.

In order to establish the telephone circuit between the video telephones of the both parties, first, the video telephone of sending part calls the video telephone of receiving part. Then, after the signal DTMF-DTA according to the transmission speed, that is, DTMF-C signal or DTMF-D signal is sent for a predetermined time period, the modem is started at the set transmission speed. In the state where the polling key 31 is operated in the video telephone of receiving part, when the ringer signal from the video telephone of sending part is detected, the relay 46 is enabled by the microcomputer 16 so as to close the telephone circuit 36, and the state where a hook switch of the audio telephone 38 is turned off, that is, the state equivalent to an off-hook state can be automatically formed. Thereafter, when the signal DTMF-DTA, that is, DTMF-C signal or DTMF-D signal from the video telephone of sending part is continuously received for a predetermined time period, the modem is set at the transmission speed corresponding to the DTMF-C signal or DTMF-D signal and started so that the image data is sent from the video memory 18 is sent. Thus, a request for sending the image data from the video telephone of sending part to the video telephone of receiving part, whereby the polling function can be performed.

Figure 14:
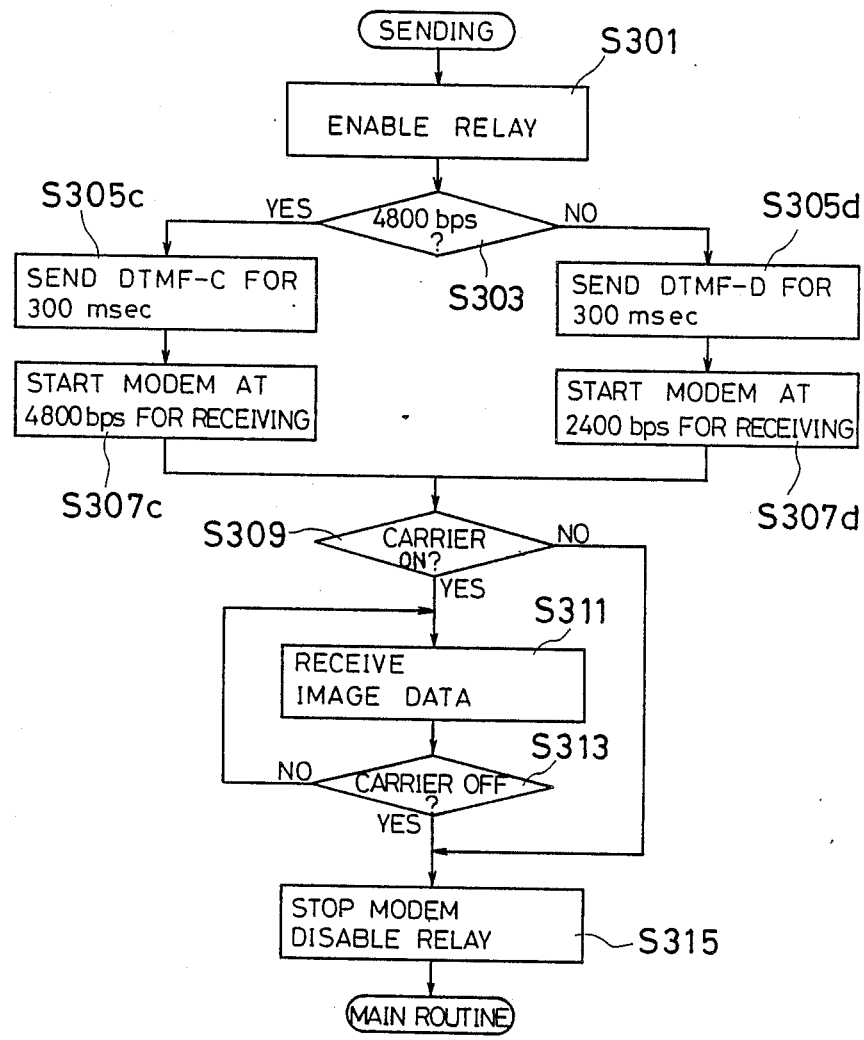
FIG. 14 is a flowchart showing an operation of a video or visual telephone of sending part in accordance with FIG. 13.

With reference to FIG. 14, in the video telephone of sending part which sends the request for sending the image data to the video telephone of receiving part, in the first step S301, the relay 34 included in the network control unit 32 is enabled. Succeedingly, in the step S303, the microcomputer 16 determines based upon the state of the transmission speed changing key 28 that the transmission speed is set at 2,400 bps or 4,800 bps. If the transmission speed is set at 4,800 bps, in the step S305c, the DTMF signal generator 40a included in the modem 40 is started so as to send the signal DTMF-DTA, that is, the DTMF-C signal which corresponds to the transmission speed of 4,800 bps for 300 milliseconds. In the succeeding step S307c, the microcomputer 16 controls the modem 40 so that the state where the image data from the video telephone of receiving part can be received at the transmission speed of 4,800 bps is set. On the other hand, if the transmission speed is set at 2,400 bps, after the DTMF-D signal as the signal DTMF-DTA is sent for 300 milliseconds in the step S305d, the modem 40 is set in the state where the image data from the video telephone of receiving part can be received at the transmission speed of 2,400 bps. Thereafter, in the video telephone of sending part, the steps S309 through S315 similar to the steps S33 through S39 of FIG. 5 embodiment are executed to receive the image data from the video telephone of receiving part.

Figure 15:
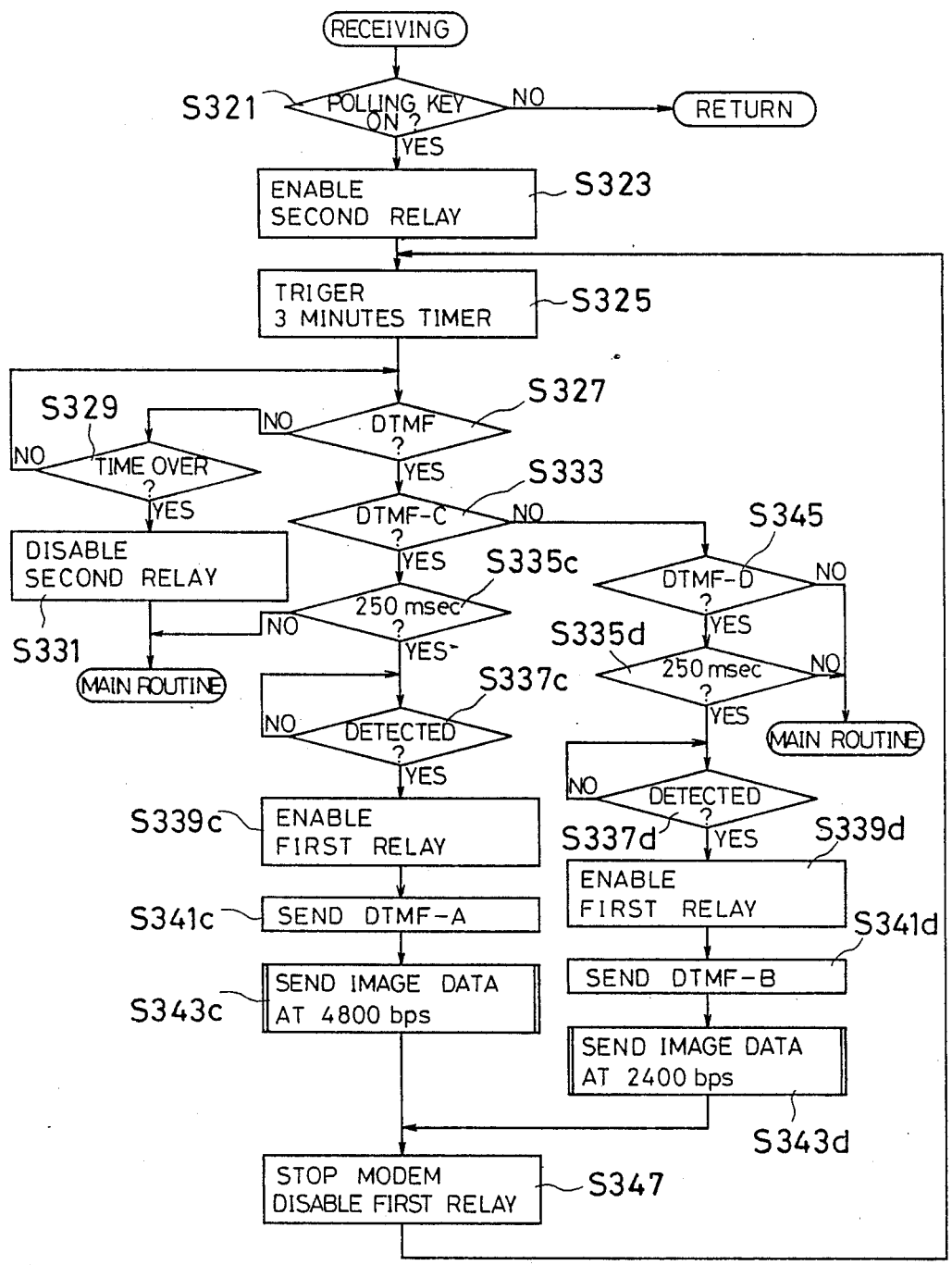
FIG. 15 is a flowchart showing an operation of a video or visual telephone of receiving part in accordance with FIG. 13 embodiment.

In the video telephone of receiving part, in the first step S321 as shown in FIG. 15, it is determined whether or not the polling key 31 (FIG. 2) has been turned on. If the polling key 31 is turned on, in response to the call from the video telephone of sending part as shown in FIG. 14, the ringer detection signal is outputted from the ringer detection circuit 44 as shown in FIG. 12. Accordingly, in the step S323, the relay 46 included in the network control unit 32 is enabled by the microcomputer 16 so as to form the state equivalent to the off-hook state of the audio telephone 38. In the succeeding step S325, the microcomputer 16 starts or triggers three-minute timer which is assigned in a suitable area or region of the RAM thereof. The three-minute timer is utilized for determining whether a specified tone signal, that is, the signal DTMF-DTA from the video telephone of sending part will be received within three minutes after the relay 46 is enabled.

If the signal DTMF-DTA is not detected within three minutes in the steps S327 and S329, in the step S331, the microcomputer 16 disables the relay 46 which has been enabled in the previous step S323.

In the step S327, if the signal DTMF-DTA is detected, in the next step S333, it is determined whether or not the detected DTMF signal is the DTMF-C signal. If the DTMF-C signal, in the next step S335c, the microcomputer 16 determines whether or not the DTMF-C signal is continuously received for 250 milliseconds. Then, in response to the end of the DTMF-C signal in the step S337c, in the next step S339c, the relay 34 included in the network control unit 32 of the video telephone of receiving part is enabled. In the next step S341c, the DTMF signal generator 40a included in the modem 40 is started by the microcomputer 16 in the video telephone of receiving part, and after sending the DTMF-A signal corresponding to the transmission speed of 4,800 bps for a predetermined time period, in the step S343c, the image data from the video memory 18 is sent to the video telephone of sending part at the transmission speed of 4,800 bps.

On the other hand, in the step S345, if it is determined that the signal DTMF-DTA which is detected in the previous step S327 is the DTMF-D signal, the steps S335d through S343d similar to the previous steps S335c through S343c are executed so that the image data is sent from the video telephone of receiving part to the video telephone of sending part at the transmission speed of 2,400 bps. In the step S347 following the step S343c or S343d, the modem 40 is stopped to operate and the relay 34 is disabled.

Thus, as in this embodiment, if the polling function is added to the video or visual telephone system, it is possible to watch the state in the room from the place where a person has gone, for example, such a video or visual telephone system can be utilized as a home security system, pet monitor system or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for transmitting image data on a telephone network, comprising the steps of:
    (a) establishing a telephone circuit between apparatuses of a sending party and a receiving party through said telephone network;
    (b) sending the image data from the apparatus of the sending party to the apparatus of the receiving party regardless of a presence and regardless of an absence of a response from the apparatus of the receiving party to the apparatus of the sending party after sending a tone signal having a specified frequency for a predetermined time period in response to an image data sending command; and (c) receiving in the apparatus of the receiving party the image data being sent from the apparatus of the sending party only when the specified tone signal is continuously received for the predetermined time period.

2. A method in accordance with claim 1, wherein said step (b) includes a step of generating a DTMF signal as said specified tone signal.

3. A method in accordance with claim 1, further comprising the steps of
(d) sending at least one command signal for designating a transmission mode from the apparatus of the sending party to the apparatus of the receiving party; and
(e) returning an acknowledge signal or negative acknowledge signal from the apparatus of the receiving party to the apparatus of the sending party when said command signal is received, said steps (d) and (e) being executed before said step (b).

4. A method in accordance with claim 3, further comprising the steps of (f) sending said image data in accordance with a transmission mode which is designated by said command signal from the apparatus of the sending party when the acknowledge signal is returned in said step (e).

5. A method in accordance with claim 4, further comprising the steps of (g) sending said image data through a predetermined transmission mode from the apparatus of the sending party when the negative acknowledge signal is returned in said step (e) or when no responsive signal is returned in said step (e).

6. A method in accordance with claim 3, wherein in the case where confirmation of the transmission mode has been made between the apparatus of the both parties in said steps (d) and (e), after said image data sending command, said steps (*b*) and (c) are executed without executing said steps (d) and (e).

7. A method in accordance with claim 5, wherein said predetermined transmission mode is a monochrome image data transmission mode.

8. A method in accordance with claim 3, wherein the step of sending includes sending a plurality of command signals for designating respective transmission modes, at least two tone signals which are different from each other being utilized respectively as two of said command in signals.

9. A method in accordance with claim 8, wherein the tone signals are DTMF signals.

10. A method in accordance with claim 5, wherein command data is sent as said command signal in said step (d), and further comprising decoding the command data.

11. A method in accordance with claim 10, further comprising the steps of (h) sending a tone signal having a specified frequency from the apparatus of the sending party prior to said step (d).

12. A method in accordance with claim 11, wherein the tone signal having said specified frequency is a DTMF signal.

13. A method in accordance with claim 1, further comprising the steps of
(i) sending a request for sending the image data from the apparatus of the receiving party to the apparatus of the sending party; and
(j) returning the image data in response to the request for sending the image data from said apparatus of the receiving party to said apparatus of the sending party when a polling mode is allowed in said apparatus of the receiving party.

14. A method for transmitting image data on a telephone network, comprising the steps of:
(a) establishing a telephone circuit between apparatuses of both parties through said telephone network;
(b) sending a tone signal having a specified frequency from any one of the apparatuses of the both parties; and
(c) sending the image data regardless of a presence and regardless of an absence of a response from the apparatus of the receiving party to the apparatus of the sending party after the sending of the tone signal.

15. A method for transmitting image data in a video or visual telephone system, comprising the steps of:
(a) establishing a telephone circuit between video or visual telephone of both parties through a telephone network;
(b) sending the image data from the video or visual telephone of the sending party to the video or visual telephone of the receiving party regardless of a presence and regardless of an absence of a response from the apparatus of the receiving party to the apparatus of the sending party after a specified DTMF signal is sent for a predetermined time period in response to an image data sending command; and
(c) receiving in the video or visual telephone of the receiving party the image data being sent from the video or visual telephone of the sending party only when the specified DTMF signal is continuously received for the predetermined time period.

16. A method in accordance with claim 15, further comprising the steps of
(d) sending at least one command signal for designating a transmission mode from the video or visual telephone of the sending party to the video or visual telephone of the receiving party; and
(e) returning an acknowledge signal or negative acknowledge signal from the video or visual telephone of the receiving party to the video or visual telephone of the sending party when said command signal is received, said steps (d) and (e) being executed before said step (b).

17. A method in accordance with claim 16, further comprising the steps of (f) sending said image data in accordance with a transmission mode which is designated by said command signal from the video or visual telephone of the sending party when the acknowledge signal is returned in said step (e) or when no responsive signal is returned in said step (e).

18. A method in accordance with claim 17, further comprising the steps of (g) sending said image data through a predetermined transmission mode from the video or visual telephone of the sending party when the negative acknowledge signal is returned in said step (e).

19. A method in accordance with claim 17, wherein in the case where confirmation of the transmission mode has been made between the video or visual telephones of the both parties in said steps (d) and (e), after said image data sending command, said steps (*b*) and (c) are executed without executing said steps (d) and (e).

20. A method in accordance with claim 18, wherein said predetermined transmission mode is a monochrome image data transmission mode.

21. A method in accordance with claim 16, wherein the step of sending includes sending a plurality of command signals for designating respective transmission modes, at least two tone signals which are different from each other being utilized respectively as two of said command signals.

22. A method in accordance with claim 18, wherein command data is sent as said command signal in said step (d), and further comprising decoding the command data.

23. A method in accordance with claim 22, further comprising the steps of (h) sending a specified DTMF signal from the video or visual telephone of the sending party prior to said step (d).

24. A method in accordance with claim 15, further comprising the steps of
(i) sending a request for sending the image data from the video or visual telephone of the receiving party to the video or visual telephone of the sending party; and
(j) returning the image data in response to the request for sending from said video or visual telephone of the receiving party to said video or visual telephone of the sending party when a polling mode is allowed in said video or visual telephone of the receiving party.

25. A method for transmitting image data in video or visual telephone system, comprising the steps of:
(a) establishing a telephone circuit between video or visual telephones of both parties through a telephone network;
(b) sending a specified DTMF signal from any one of the video or visual telephones of the both parties; and
(c) sending the image data regardless of a presence and regardless of an absence of a response from the apparatus of the receiving party to the apparatus of the sending party after the sending of the specified DTMF signal.

26. A system for transmitting image data on a telephone network, comprising:
means for establishing a telephone circuit between apparatuses for both parties through said telephone network or equivalent;
means for sending a tone signal having a specified frequency from any one of the apparatuses of the both parties prior to sending the image data from any one of the apparatuses of the both parties; and
means for sending the image data regardless of a presence and regardless of an absence of a response from the apparatus of the receiving party to the apparatus of the sending party after sending the tone signal.

27. A system for transmitting image data on a telephone network, comprising:
first means for establishing a telephone circuit between the apparatuses of both parties through said telephone network;
second means for sending the image data from the apparatus of the sending party to the apparatus of the receiving party regardless of a presence and regardless of an absence of a response from the apparatus of the receiving party after sending a specified signal for a predetermined time period in response to an image data sending command; and
third means for receiving in the apparatus of the receiving party the image data being sent from the apparatus of the sending party.

28. A system in accordance with claim 27, wherein said third means includes means for receiving the image data only when the specified signal is continuously received for a predetermined time period.

29. A method of transmitting image data on a telephone network, comprising the steps of:
(a) establishing a telephone circuit between an apparatus of a sending party and an apparatus of a receiving party through said telephone network;
(b) sending the image data from the apparatus of the sending party to the apparatus of receiving party regardless of a presence and regardless of an absence of a response from the apparatus of the receiving party to the apparatus of the sending party after sending a specified DTMF signal for a predetermined time period in response to an image data sending command;
(c) starting a modem in the apparatus of the receiving party only when the specified DTMF signal is continuously received for the predetermined time period; and
(d) receiving the image data being sent from the apparatus of the sending party through the modem which has been started in the step (c) in the apparatus of the receiving party.

30. A method of transmitting image data on a telephone network, comprising the steps of:
(a) establishing a telephone circuit between apparatuses of two parties through said telephone network;
(b) sending a specified DTMF signal from any one of the apparatuses;
(c) sending the image data regardless of a presence and regardless of an absence of a response from the other of the apparatuses after sending the specified DTMF signal; and
(d) starting a modem of the other one of the apparatuses only when the specified DTMF signal is continuously received for a predetermined time period.

31. A method of transmitting image data in video or visual telephone system, comprising the steps of:
(a) establishing a telephone circuit between video or visual telephones of a sending party and a receiving party through a telephone network;
(b) sending the image data from the video or visual telephone of the sending party to the video or visual telephone of the receiving party regardless of a presence and regardless of an absence of a response from the apparatus of the receiving party to the apparatus of the sending party after sending a specified DTMF signal for a predetermined time period in response to an image data sending command;
(c) starting a modem of the video or visual telephone of the receiving party only when the specified DTMF signal is continuously received for the predetermined time period; and
(d) receiving the image data sent from the video or visual telephone of the sending party through the modem of the video or visual telephone of the receiving party.

32. A method of transmitting image data in video or visible telephone system, comprising the steps of:
(a) establishing a telephone circuit between video or visible telephones of two parties through said telephone network;

(b) sending a specified DTMF signal from any one of the video or visible telephones prior to sending image data from any one of the video or visible telephones;

(c) sending the image data regardless of a presence and regardless of an absence of a response from the other of the video or visible telephones after sending the specified DTMF signal; and (d) starting a modem of the other one of the video or visible telephones only when the specified DTMF signal is continuously received for a predetermined time period.

33. A system of transmitting image data on a telephone network, comprising:

means for establishing a telephone circuit between apparatus for two parties through said telephone network;

means for sending a specified DTMF signal from any one of the apparatuses prior to sending image data from any one of the apparatuses;

means for sending the image data from any one of the apparatus regardless of a presence and regardless of an absence of a response from the other of the apparatuses; and means for starting a modem of the other one of the apparatuses only when the specified DTMF signal is continuously received for a predetermined time period.

34. A system of transmitting image data on a telephone network, comprising first means for establishing a telephone circuit between apparatus of a sending party and an apparatus of a receiving party through said telephone network;

second means for sending the image data from the apparatus of the sending party to the apparatus of the receiving party regardless of a presence and regardless of an absence of a response from the apparatus of the receiving party after sending a specified DTMF signal for a predetermined time period in response to an image data sending command;

third means for starting a modem of the apparatus of receiving party only when the specified DTMF signal is continuously received for the predetermined time period; and fourth means for receiving the image data being sent from the apparatus of the sending party through the modem which has been started in the apparatus of the receiving party.

* * * * *